Aug. 13, 1935.       R. G. WALTENBERG       2,011,546
THERMOSTATIC DEVICE
Filed Aug. 31, 1932
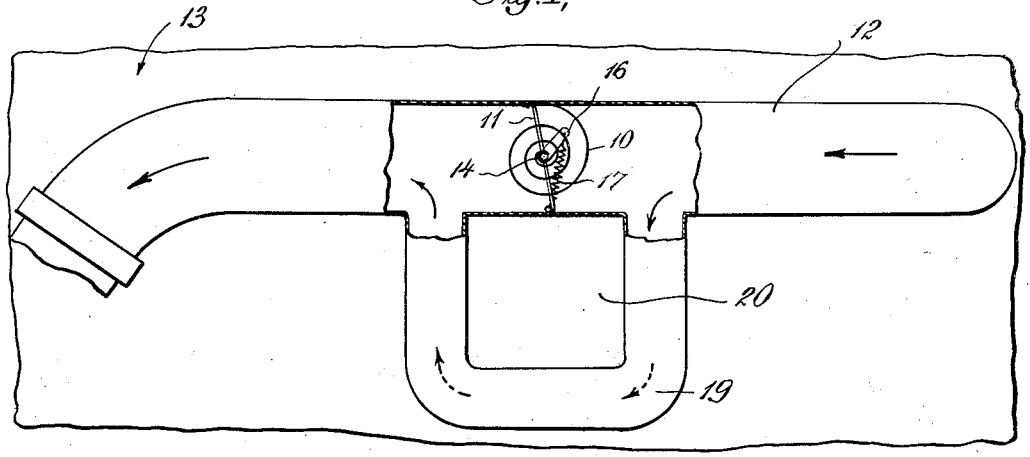
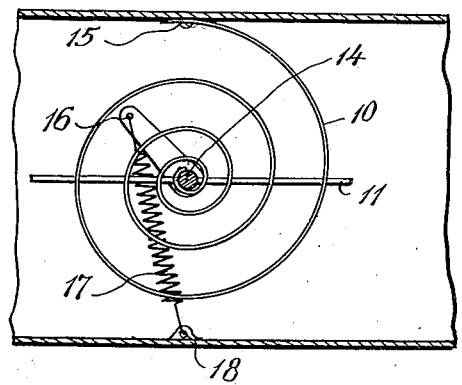
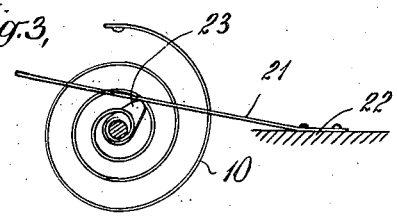
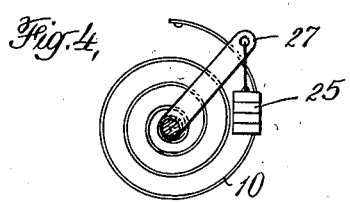
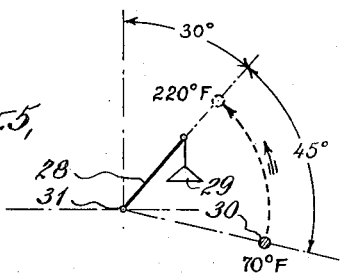
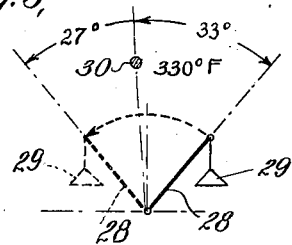
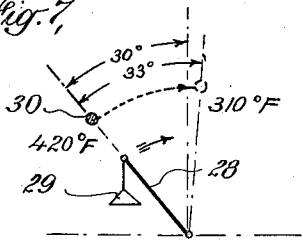
INVENTOR
Romaine G. Waltenberg
BY
Pennie, Davis, Marvin, Edmonds
ATTORNEYS Patented Aug. 13, 1935

2,011,546

UNITED STATES PATENT OFFICE 2,011,546

THERMOSTATIC DEVICE

Romaine G. Waltenberg, Roselle, N. J., assignor to The H. A. Wilson Company, a corporation of New Jersey Application August 31, 1932, Serial No. 631,147

2 Claims. (Cl. 236—93)

This invention relates to thermostatic devices and has particular reference to devices for producing motive power in response to temperature changes.

The movements produced by a thermostatic device in response to temperature changes are substantially continuous throughout the temperature range to which the device is subjected, but in the majority of uses of thermostatic devices, only so much of the total movement produceable by the device is utilized as occurs through a relatively narrow temperature range whose upper and lower limits lie well within the corresponding limits of the temperature range to which the device is actually subjected. Inasmuch as the movement of the thermostatic device in response to the changes in temperature above and below the upper and/or lower limits of the operative temperature range are not desired, the thermostatic device, or the member actuated thereby, or some other connected element, is limited in its movement by stops or the like, which determine the extreme positions thereof. Inasmuch as the response of the thermostatic device to temperature changes above and/or below the operative temperature range is restricted by the stops or the like, the resultant stresses of the thermostatic device due to this constraint are liable to cause a permanent deformation of the thermostatic device, with the result that the operating characteristics of the device are altered and it no longer functions properly.

According to the present invention, a thermostatic device is provided which automatically compensates for the stresses imposed upon the thermostat by its restrained tendency to overexpand or overcontract at temperatures above and/or below the predetermined temperature range of operation, so that the metal is not deformed or otherwise injured and the device retains its accurate operating characteristics for an indefinite time.

The invention comprises a thermostatic device having means actuated by the thermostat for applying a load to the thermostat during its period of operation, which either mechanically extends or contracts it so that the unused energy of the thermostatic device produced by the tendency toward over-expansion or over-contraction of the thermostat at temperatures outside of the operating range of temperature, which would ordinarily strain the thermostat, is completely absorbed by being harmlessly expended in taking up the aforementioned mechanical extension or contraction of the thermostat. This load-applying means may be a spring, a weight, a cam, or the like, which mechanically displaces the moving part of the thermostat, either in the direction or counter to the direction of its normal movement which is determined by the thermostatic action.

In one preferred embodiment of the invention, a bimetallic thermostat is anchored at one end, so that its other end is free to move between stops or the like, through the operating range of temperature for actuating a valve or other member. A weight, cam, spring or the like, connected to the thermostat and actuated thereby, preferably at or near the upper and/or lower limits of the operating temperature range, either advances toward or withdraws from the corresponding stop the free end or other moving part of the thermostat which is moving toward the stop in accordance with the normal thermostatic action induced by the changing temperature to which the thermostat is subjected. Accordingly, the thermostat is retracted, or wound up if a spiral element, as its moving part approaches the point corresponding to the lowermost limit of the operating temperature range, so that as the thermostat tends to move further in response to temperatures below the lower limit of the operating range, this tendency is compensated for or absorbed by the retracted or wound up condition of the thermostat, whereby the thermostat is not strained.

Conversely, the thermostat is extended, or is unwound if a spiral element, as its moving part approaches the point corresponding to the uppermost limit of the operating temperature range, so that as the thermostat tends to move further in response to temperatures below the upper limit of the operating range, this tendency is compensated for or absorbed by the extended or unwound condition of the thermostat, so that the thermostat is not strained.

The compensating spring, cam or weight, is preferably so connected to the thermostat that the latter must overcome the resistance of the former before the thermostat can move, so that mechanical energy is stored up in the device, which is released when the thermostat finally overcomes the resistance of the load, whereby snap action is produced. This is preferably accomplished by providing a dead center for the load, on one side of which the thermostat is retarded to store up energy in the device, so that as the load is moved over the dead center by the thermostat, the stored energy is released, somewhat in the manner of a toggle, and the movement of the thermostat is sudden and positive.

Although the thermostatic device of this invention has many uses, it is particularly adaptable for thermostatically controlling the flow of the exhaust gases of an internal combustion engine to utilize them for the purpose of conditioning the fuel in accordance with the thermal state of the engine. In one arrangement of this nature, a butterfly valve in the exhaust manifold is initially closed to divert the exhaust gases through a by-pass leading to a heating jacket around the carburetor, intake manifold, "hot-spot", or the like, for heating the air, fuel, or air-fuel mixtures therein until a predetermined temperature condition is obtained, whereupon the butterfly valve is opened by a thermostat to permit direct flow of the exhaust gases through the exhaust manifold. Since the temperature to which the thermostat is subjected subsequently rises considerably above the temperature at which the thermostat opens the valve, and also falls considerably below the temperature at which the thermostat closes the valve, the thermostat is strained and is liable to be deformed in the manner previously explained.

With the arrangement of the new invention, the movement of the thermostat in response to the valve-opening temperature is initially retarded by the weight, cam or spring, so that the latter snaps over the dead center with a toggle action to rapidly open the valve and apply the force of the weight, cam or spring to the thermostat to extend or unwind it, whereby its subsequent tendency to expand thermostatically in response to temperatures higher than the operating range will be absorbed without straining the thermostat.

As the flow of exhaust gases stops upon stopping of the engine, the cooling thermostat moves the weight, cam or spring beyond dead center to close the valve rapidly and positively and also to retract or wind up the thermostat, so that it will absorb its tendency toward further contraction in response to temperatures below that at which the valve closed. Accordingly, for both open and closed positions of the valve, the injurious strains ordinarily imposed upon the thermostat as the result of temperatures higher and lower than the corresponding limits of the operating temperature range are eliminated in the arrangement of this invention, and the thermostat is not liable to deformation or other injury in consequence.

For a better understanding of the invention, reference may be had to the accompanying drawing, in which Figure 1 illustrates an application of the invention to an automobile exhaust manifold for thermostatically controlling the flow of the gases;

Figure 2 is an enlarged view thereof;

Figures 3 and 4 are modified forms of the thermostatic device of this invention; and Figures 5, 6, and 7 are diagrams illustrating the mode of operation of the new thermostatic device.

In the drawing, numeral 10 designates a bimetallic strip thermostat in spiral form, one end of which is anchored and the other end of which is movable in accordance with temperature changes to provide motive power for actuating any desired member or element.

In order to illustrate the utility of the invention, the thermostatically actuated member or element may be considered to be a butterfly valve 11. Valve 11 is located in the exhaust manifold 12 of an automobile engine 13, or the like, and mounted on a shaft 14 journaled at its opposite ends in the manifold 12 and carrying the movable end of the thermostat 10, as illustrated in Figs. 1 and 2. The other end of the thermostat 10 is secured by a rivet, or the like, 15 to manifold 12. Accordingly, as the thermostat 10 expands and contracts in response to temperature changes, the valve 11 is rotated about its shaft 14 to open and closed positions, respectively.

Secured to the shaft 14 is a lever 16, the free end of which is connected to one end of a spring 17, whose other end is anchored in the eye or the like 18 in the manifold 12.

The manifold 12 is provided with a by-pass 19 which serves as a jacket for body 20 which may be the intake manifold, a portion of the carburetor, or the hot spot of the engine through which heat is transmitted to the air, fuel, or air-fuel mixtures supplied to the engine. It will be seen that when the valve 11 is closed, the exhaust gases flowing through the manifold 12 are diverted through the by-pass 19 and circulate around the body 20. When the valve 11 is open, the gases pass directly through the manifold 12 and are not diverted through the by-pass 19. The valve 11 is closed when the engine is cold and remains closed until the exhaust gases flowing through manifold 12 attain a predetermined temperature, for example, approximately 330° F., whereupon the thermostat 10 expands to open the valve 11 to the position shown in Fig. 2. The engagement of the valve 11 with the manifold 12 limits the movement of the valve to closed position and a stop, not shown, limits the movement of the valve to open position.

The initial movement of the thermostat at this temperature is retarded by the spring 17 until the lever 16 passes over its dead center point to permit spring 17 to open the valve 11 with a snap action. The sudden load applied to the thermostat 10 by the spring 17 after the lever 16 moves beyond dead center, extends or unwinds thermostat spiral 10, thereby storing up mechanical energy therein. It is noted that the extension or unwinding of the thermostat 10 is in the direction of the normal movement of its free end in accordance with increasing temperatures, so that after the valve 11 has been opened and is held in open position by a stop or the like, not shown, the tendency of the thermostat to continue expanding at temperatures above the normal operating range is absorbed by this extended or unwound condition of the thermostat provided mechanically by the spring 17. Accordingly, the thermostat is not strained when the temperature rises above its normal operating range. Furthermore, as the temperature decreases upon stopping the engine, the thermostat is not required to wind up materially before it attains a sufficient tension to close the valve, as is the case with usual thermostats, since it starts at neutral position.

The closing action of the valve is similar to the opening action thereof, since the contraction of the thermostat causes the lever 16 to move beyond dead center, whereupon the spring 17 snaps the valve to closed position. The load imposed upon the thermostat 10 by the valve-closing action of the spring 17 serves to retract or wind up the thermostat. Accordingly, as the thermostat cools down below the lower limit of the normal operating temperature range, the tendency of the thermostat to further contract is absorbed by its precontracted or prewound condition resulting from the action of the spring 17. Thus, the thermostat is not strained as a result of its tendency to over-contract at temperatures below the lowermost limit of its normal operating range.

Instead of employing the coil spring 17 to apply the load to the thermostat, a leaf spring 21 anchored at one end on support 22 and engaging the end of lever 23 may be used with equal facility. It will be seen that the thermostat is extended or unwound as the result of the pressure of spring 21 on the lever 23 when the lever is moved beyond dead center, and that the thermostat is retracted or wound up when the lever is moved beyond dead center in the opposite direction.

Instead of using springs as in the arrangement of Figs. 2 and 3, a weight 25 suspended from or otherwise applied to the free end of lever 27 may be employed to exert the requisite forces on the thermostat to produce the effects described.

Figs. 5, 6, and 7 illustrate graphically the action of the thermostatic device of this invention, when it is utilized for controlling the butterfly valve in the exhaust manifold of an internal combustion engine. In these diagrams numeral 28 designates the lever fixed to the free end of the thermostat, 29 the load applied to the lever, and 30 the normal position of the thermostat, which moves the lever 28 through an angle about the pivot 31. The thermostat moves theoretically through an angle of 45° in response to a temperature change from approximately 70° F. to approximately 220° F. before its initial tension is relieved. At 220° F. the thermostat would ordinarily begin to move, until at 330° F. the thermostat 30 would have moved through 33°, but it is restrained by load 29. At 330° F. the energy of the thermostat is sufficient to overcome the load, and is the temperature at which the valve is intended to be opened. The lever 28 is accordingly moved through an angle of 33° beyond dead center and falls through a further angle of 27° ahead of the normal position of the thermostat 30.

It will be seen upon referring to Fig. 6 that the thermostat is accordingly extended or unwound through the angle of 27°, which means that it may over-expand at temperatures higher than 330° F. through the equivalent of 27° angle before the thermostat begins to be strained. As illustrated in Fig. 7, this maximum temperature may be 420° F., at which point the over-expansion tendency of the thermostat is substantially equal to the mechanical extension or unwinding imparted to the thermostat by the load 29.

When the temperature to which the thermostat is subjected falls, as when the engine is stopped, from 420° F. to 310° F., the thermostat moves the load 29 beyond dead center in a clockwise direction to snap the valve closed. The force applied to the thermostat by the load 29 retracts or winds up the thermostat, so that it may contract below 220° F. to 70° F. without straining the thermostat, the mechanical retraction or winding up of the thermostat having been sufficient to compensate for any tendency to over-contract as a result of decreasing temperatures. Also, this arrangement secures a relatively large angular displacement with a small temperature change.

It will be noted that the valve does not close until approximately 310° F., although it opened at about 330° F., so that between 310° F. and 330° F. the valve may be open or closed, but above 330° F. the valve is always open, and below 310° F. the valve is always closed.

Snap action over the whole operating range is not a necessary feature of this type of construction. The amount of movement may vary with temperature change and be gradual for a part or the whole of the operating range. It should be noted that the gradual movement over the whole of the operating range is obtained when the total movement is on one side of the neutral position of the weight or spring. Snap action from a given position to and over a neutral position is obtained when the change in torque or pressure of a spring or weight is more than the change in pressure or torque of the thermometal element for any intermediate corresponding movement from the given position. A gradual movement with temperature change is obtained when the change in pressure or torque of the spring or weight is continuously less than the change in pressure of the thermometal for a corresponding movement. If the change in torque of the spring or weight was exactly equal to the change in torque of the thermometal at all points over a range of movement then an infinitesimal change in temperature of the thermometal would produce movement from one end of the range to the other. It follows that for either snap action or gradual movement over any range of movement, the smaller the difference between the change in torque of the weight and the change in torque of the thermometal, the less temperature change will be required to give movement over this range.

The thermostatic device of this invention is accordingly applicable to heat control devices which are subjected to either higher or lower or both higher and lower temperatures than the upper and lower limits of its operating range, as a result of which the thermostat is unduly strained and liable to permanent deformation. The application of the invention to the thermostatic control of exhaust gases of an internal combustion engine merely illustrates its adaptability and it is to be understood that the invention is not limited to this particular use, but has application to all conditions of temperature control in which the temperature ranges exceed the operating ranges. Also, the invention is not restricted to spiral thermostats, but may be used with any thermostat which is subject to temperatures above or below the operating range thereof.

I claim:

1. In a thermostatic device, the combination of a conduit, a bi-metallic coil anchored at one end and arranged to bend in one direction in response to a rise in temperature in the conduit and bend in the opposite direction in response to a decrease in temperature therein, a valve in the conduit connected to the other end of the coil and operable thereby to assume high and low temperature positions, and means for applying a continuous load to the valve to bend the coil mechanically in one direction at the high temperature position of the valve, and to bend the coil mechanically in the opposite direction at the low temperature position of the valve.

2. In a thermostatic device, the combination of a conduit, a bi-metallic coil anchored at one end and arranged to bend in one direction in response to a rise in temperature in the conduit and to bend in the opposite direction in response to a decrease in temperature therein, a valve in the conduit connected to the other end of the coil and operable thereby to assume high and low temperature positions, and means for applying a continuous load to the valve substantially tangentially of the convolutions of the coil to bend the latter mechanically in one direction at the high temperature position of the valve, and to bend the coil mechanically in the opposite direction at the low temperature position of the valve.

ROMAINE G. WALTENBERG.